Nov. 17, 1925.  N. CORSI ET AL  1,561,832
INSECT TRAP
Filed July 29, 1925
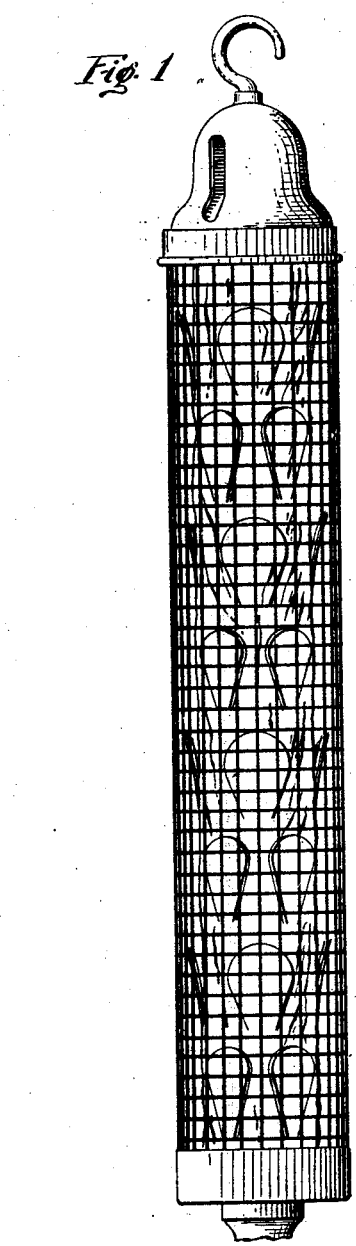
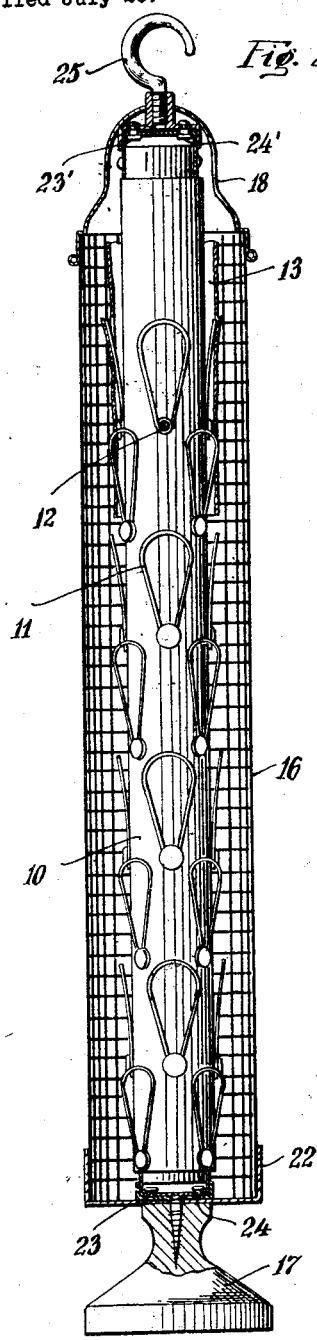
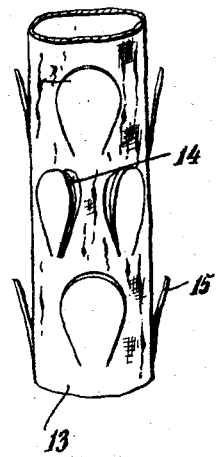
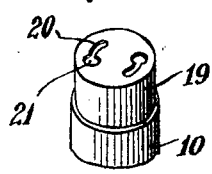
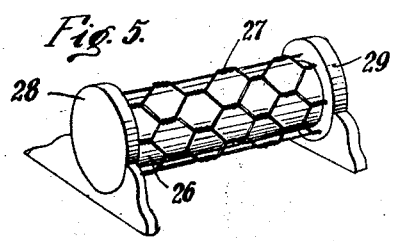
Inventor
Nicola Corsi & Angelo Costantino
By their Attorney
Mario Schiesari Patented Nov. 17, 1925.

1,561,832

UNITED STATES PATENT OFFICE.

NICOLA CORSI AND ANGELO COSTANTINO, OF BROOKLYN, NEW YORK.

INSECT TRAP.

Application filed July 29, 1925. Serial No. 46,814.

*To all whom it may concern:*

Be it known that we, NICOLA CORSI, a subject of the King of Italy, residing at Brooklyn, in the city of New York, county of Kings, State of New York, and ANGELO COSTANTINO, a citizen of the United States, residing at Brooklyn, in the city of New York, county of Kings, State of New York, have invented certain new and useful Improvements in Insect Traps, of which the following is a specification.

This invention relates to insect traps and more particularly to devices of this character which, while being fully accessible to bugs, flies and other insects, are provided with a covering acting as a shield to prevent the viscous layer which is spread over the surface of the operative part of the device from coming into contact with outside objects.

The primary object of this invention is to provide an insect trap of a novel and improved construction, comprising a core covered with some suitable viscous material adapted to prevent the escape of any insect that should venture upon said core, and a perforated shield detached from said core entirely surrounding it, permitting bugs and other insects to enter the trap and at the same time permitting the safe handling and laying of the trap anywhere without danger of the viscous material coming in contact with the hands or clothing.

Another object of this invention is to provide an insect trap of a simple and convenient design, adapted to be readily taken apart for the purpose of renewing the viscous layer which is used to catch bugs, flies and other insects.

Other objects and advantages of the present invention will more fully appear as the description proceeds and will be set forth and claimed in the appended claims.

Our invention is illustrated in the accompanying drawings in which Fig. 1, is a view in elevation of the assembled device provided with a stand and also provided with a hook for its suspension;

Fig. 2 is a partly sectional view in elevation of the same;

Fig. 3 is a detail view of a paper or cloth covering which may be used for spreading viscous material;

Fig. 4 is a detail view in perspective of one end of the core member showing the preferred method of joining the various parts together; and Fig. 5, is a side view in elevation of an insect trap modified for a two end support in a horizontal position.

Referring to Figs. 1 to 4, 10 designates a longitudinal core which may be made of wood, upon which are secured a plurality of wire loops 11, attached at one end as at 12 to the core and slightly projecting outwardly at the other end from said core. Over said core is inserted a tubular paper member 13, preferably provided with cuts as at 14 forming ear like lugs 15, corresponding to and registering with loops 11 when the tubular member is inserted in position as shown in Fig. 2. After insertion, this tubular covering is spread with a suitable viscous material of the kind commonly used in insect paper such as Tanglefoot and the like.

The core is then provided with a suitable perforated covering, for instance, a covering such as 16 made of open wire netting, which extends almost for the entire length of the core, and the diameter of which is considerably larger than that of the core so as to leave an annular space between the core of the shield, allowing ample room for the passage of bugs and insects of ordinary size. An insect alighting on the shield will instinctively crawl through the openings in said shield and walk along the inner surface and will eventually come across one or the other of the wire loops with the paper covering lugs, one end of which is detached from the core as stated, coming near enough to the inner surface of the shield to be within reach of any bug or insect walking along said inner surface. The insect will, therefore, move over to the core being attracted to it by the smell and by the taste of the viscous material, and will, therefore become entangled and caught by said material which will prevent its escape.

The outer shield is held in position between a pedestal or end base 17 and a cover 18 at the other end in any suitable manner. A convenient way of assembling the device is illustrated in the drawings, in which it is seen that each end of the core 10 is provided with a metallic cap 19, the end face of which is formed with two segmental slots 20, terminating in an opening 21 of a diameter larger than the width of the slots. The pedestal or base 17, is in its turn provided with a cup like member 22, the inner diameter of which is the same as the outer diameter of the shield. The bottom of said cup member is provided with two screws or rivets 23, 24, adapted to register with and to be inserted through openings 21, as shown in Fig. 2. In other words, the slots 20 and screws or rivets 23, 24 provide a bayonet joint between the pedestal or base and the core, because after inserting the screws or rivets 23, 24 through the openings 21, the core may be turned around a certain angle causing the stems of the screws or rivets 23, 24 to enter the slot part 20 proper of the segmental slots, which will thus securely interlock with said screws or rivets.

In the same manner, covering 18 is provided with screws or rivets 23', 24' adapted to interlock with slots 20 at the other end of the core. Said cover 18 has a cup like outline and the diameter of its edge portion is such as to permit insertion of the cover upon the other end of the shield. The pedestal member of the cover therefore, acts as positioning member for both the core and the shield while the core acts as the connecting member holding the various parts together.

The device may be laid upon a table, remaining supported by the pedestal of base member 17 in a vertical position or else it may be suspended in a suitable place by means of a hook member 25, which may be attached to the cover. However, the device is also particularly well adapted for insertion under the covers of the bed in order to catch bedbugs or in closets or drawers where linen is kept, because the shield constitutes a protection preventing actual contact between the viscous material and the linen. For this reason, the hook member 25 is made removable and a handle of any suitable form may be substituted for it, as a more convenient means of handling the device for these purposes. A handle is more suitable for the insertion and removal of the device from a bed or drawer and at the same time, the danger of tearing linen by means of the hook will be removed.

The device may also be made to be supported at the two ends in a horizontal position as shown in Fig. 5. The construction of the device shown in said figure is substantially the same as previously described with the difference that the core 26 and the shield 27 are positioned and supported by two end supports 28, 29 which permit of laying the device upon the table or upon the floor underneath cupboards and the like, in a horizontal position. This makes it easier to catch such kinds of insects like cockroaches, that dwell in dark corners and in cracks under the furniture and which do not fly but walk or crawl. These insects are apt to be larger in size than flies and small bugs and therefore it will be preferable in this case to make the shield of wire netting having a sufficiently large mesh as shown in the drawing. Of course, expanded or perforated metal may be used instead of wire netting if preferred.

The paper used for the tubular covering is preferably dark green and crinkled so as to have the appearance of moss or vegetable matter towards which insects are apt to be more strongly attracted.

The paper tubular member is quite inexpensive and therefore may be changed as often as desired. The viscous layer, as stated, is preferably spread after the paper tube has been set in position. The wire netting of which the shield is made is preferably stiff enough so that it cannot easily be crushed or deformed.

The device described lends itself to various obvious modifications which do not constitute departures from the scope of the invention. For instance, the core member may be made of glass or else it may be made with perforations to afford the possibility of internal lighting by means of a small electric bulb, to catch those insects such as moths, that are particularly attracted by light. The same object may also be attained by making the core with a polished or light reflecting surface and adapted therefore, to reflect the light produced by an external source.

Another possible modification consists in making the core out of sheet metal with the projecting parts such as 15 integral therewith and in spreading an adhesive coating directly upon the surface of the core. In this case, the adhesive coating may be renewed by first burning or dissolving in a suitable solvent, the coating formerly used.

The drawings, are therefore, intended for illustrative purposes only and not in a limiting sense, and accordingly, we reserve ourselves the right to carry our invention into practice in all those ways and manners which may enter fairly into the scope of the appended claims.

We claim:

1. In a device of the class described, the combination with a core member carrying an adhesive coating, of a shield member having openings permitting insects to reach said core member, said shield member leaving an annular space around said core member sufficient for the passage of said insects, and parts projecting from the surface of said core member towards the inner surface of said shield member, to points within the reach of insects within said shield member.

2. In a device of the class described, the combination with a longitudinal tubular shield having openings sufficient for the passage of insects, of a core member inserted within said shield leaving an annular space between its surface and the inner surface of said shield, parts projecting from the surface of said core member towards the inner surface of said shield, and an adhesive covering for said core member.

3. In a device of the class described, the combination of a tubular perforated shield member, a core member having an adhesive surface adapted to be inserted therein, means for maintaining said shield and core members in their proper relative positions, and parts projecting from the surface of said core members towards the inner surface of said shield member.

4. In a device of the class described, the combination of a tubular perforated shield member, a core member adapted to be inserted therein, means for maintaining said shield and core members in their proper relative positions, parts projecting from the surface of said core member towards the inner surface of said shield member, and a tubular adhesive covering for said core member.

5. In a device of the class described, the combination of a tubular perforated shield member, a core member adapted to be inserted therein, two end members adapted to maintain said shield and core members coaxial to each other, parts projecting from the surface of said core member towards the inner surface of said shield member, a tubular adhesive covering for said core member, and means for connecting said core member to said end members.

NICOLA CORSI.
ANGELO COSTANTINO.